United States Patent [19]

Fonoimoana

[11] Patent Number: 4,936,338
[45] Date of Patent: Jun. 26, 1990

[54] FLOATING DRAIN SEAL APPARATUS

[76] Inventor: Vanu M. Fonoimoana, 55-370 Kamehameha Hwy., Laie, Hi. 96762

[21] Appl. No.: 413,210

[22] Filed: Sep. 27, 1989

[51] Int. Cl.⁵ .................. F16K 31/22; F16K 33/00
[52] U.S. Cl. ................................. 137/433; 4/287
[58] Field of Search ............ 137/429, 430, 433, 424, 137/425, 192, 202; 73/322.5; 4/286, 287, 290, 295

[56] References Cited

U.S. PATENT DOCUMENTS

| | | | |
|---|---|---|---|
| 576,790 | 2/1897 | O'Brien | 137/433 |
| 1,423,679 | 7/1922 | Pavitchich | 137/433 |
| 1,982,555 | 11/1934 | Van Der Horst | 137/433 |
| 2,531,721 | 11/1950 | Brock | 137/433 |
| 2,627,868 | 2/1953 | Runnels | 137/433 |
| 2,758,664 | 8/1956 | Koenig | 137/433 |
| 2,787,376 | 4/1957 | Coulson | 137/433 |
| 3,829,636 | 8/1974 | Scott | 73/322.5 |
| 4,088,149 | 5/1978 | Logsdon | 137/433 |
| 4,104,004 | 8/1978 | Graef | 137/202 |
| 4,296,778 | 10/1981 | Anderson | 137/433 |

*Primary Examiner*—George L. Walton
*Attorney, Agent, or Firm*—Leon Gilden

[57] ABSTRACT

A floating drain seal organization is utilized in combination with a drain formed with a conical bottom surface and a coaxially aligned outlet pipe. A float plug with a complementary conical bottom surface is spaced from the bottom surface of the drain to effect passage of drainage water therebetween. The float includes a planar top surface cooperative with an annular tubular seal coaxially spaced exteriorly of a circular matrix of openings. The float includes a hemispherical depression formed coaxially into its top surface to receive a hemispherical bottom portion of a seal coaxially aligned within the drain to effect sealing of the drain when a plugged or a slowed drain condition backs up drainage water therethrough.

3 Claims, 4 Drawing Sheets

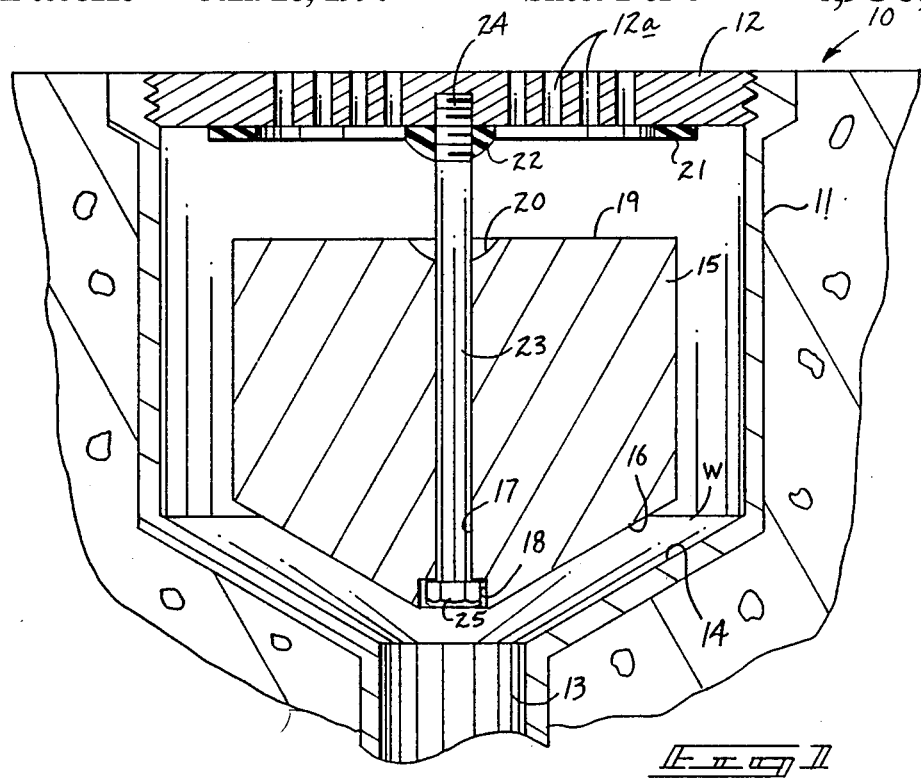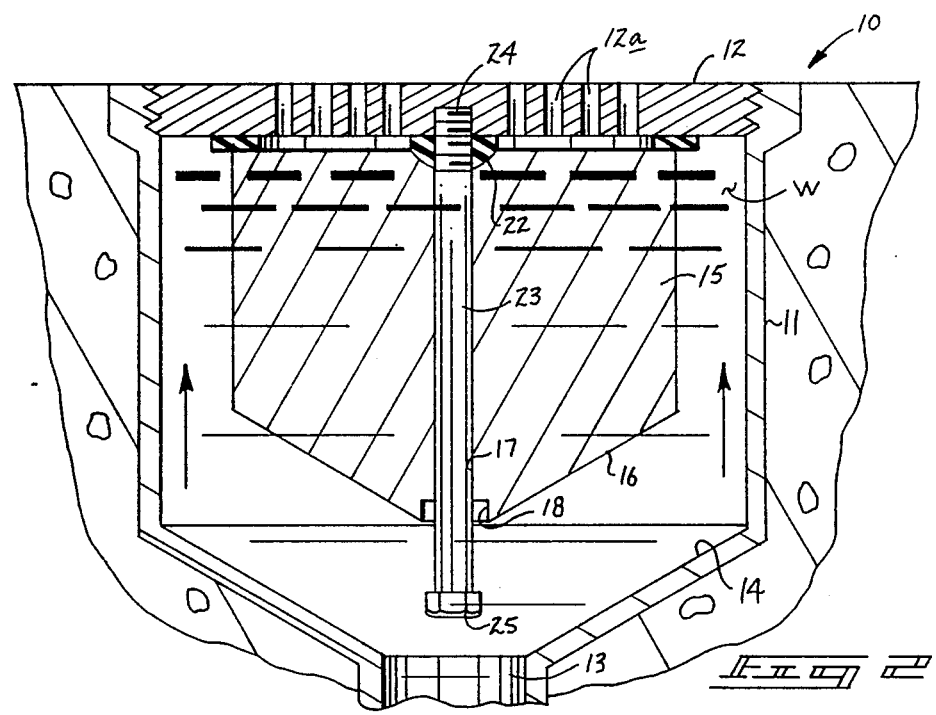

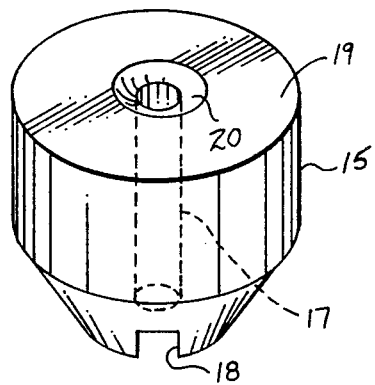
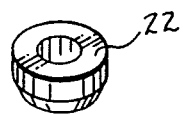
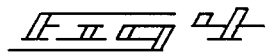

FLOATING DRAIN SEAL APPARATUS

BACKGROUND OF THE INVENTION

1. Field of the Invention

The field of invention relates to valving arrangements, and more particularly pertains to a new and improved floating drain seal wherein the same utilizes a float cooperative with bracket portions to effect closure of a drain during periods of diminished drainage capacity of the associated drain member.

2. Description of the Prior Art

The use of drains in the prior art have been of conventional construction, but have heretofore failed to employ an effective valving arrangement automatically operative during periods of drainage blockage or reduced drain flow. The prior art includes U.S. Pat. No. 4,449,976 to Kamen utilizing a valving arrangement to reduce a rate of flow from a reservoir, whereupon a reduced quantity of water within a flow port effects closure of the port by a floating seal member.

U.S. Pat. No. 3,662,725 to Dragon, et al., provides for an evaporation control device for use particularly with fuel tanks, wherein a plurality of spherical balls will arise within a cylindrical chamber to effect sealing of a vented passageway upon fluid being directed towards that passageway.

U.S. Pat. No. 4,535,799 to Boley sets forth a valve positionable within a gas line wherein entrained liquid in the gas stream floats the enclosed spherical valve upwardly where it seats within a horizontally oriented seat, whereupon opening of an underlying drain enables purging of fluid from within the gas line.

U S. Pat. No. 3,770,001 to Davis provides for a valve including a pliable seat cooperative with a spherical valve, whereupon upward movement of the spherical valve cooperates with a pliable seat to effect closure of the fluid line.

As such, it may be appreciated that there is a continuing need for a new and improved floating drain seal wherein the same enables automatic closure of the drainage device upon back filling of the drain wi&h fluid directed therethrough.

SUMMARY OF THE INVENTION

In view of the foregoing disadvantages inherent in the known types of drain seals now present in the prior art, the present invention provides a floating drain seal wherein the same affects closure of a fluid drain upon the drain back filling with a fluid passing therethrough. As such, the general purpose of the present invention, which will be described subsequently in greater detail, is to provide a new and improved floating drain seal which has all the advantages of the prior art drain seal and none of the disadvantages.

To attain this, the present invention includes a drain housing formed with a conical bottom wall and coaxially aligned drain pipe with a float vertically positionable within the housing and formed with a conical bottom surface spaced from the bottom wall of the drain housing to enable passage of fluid therethrough. The float includes a planar top surface formed with an axially aligned hemispherical depression cooperative with a hemispherical seal coaxially aligned within a drain plate overlying the drain housing. The drain plate is provided with a series of apertures confined within a predetermined radius wherein the float is of a radius greater than that defined by the determined radius and is cooperative with a gasket, whereupon upward movement of the drain seal in contact with the gaskets effect closure of the apertures within the plate to prevent further fluid from entering or leaving the drain housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application. which is measured by the claims, nor is it intended to be limiting as to the scope of the invention in any way.

It is therefore an object of the present invention to provide a new and improved floating drain seal which has all the advantages of the prior art drain seals and none of the disadvantages.

I& is another object of the present invention to provide a new and improved floating drain seal which may be easily and efficiently manufactured and marketed.

It is a further object of the present invention to provide a new and improved floating drain seal which is of a durable and reliable construction.

An even further object of the present invention is to provide a new and improved floating drain seal which is susceptible of a low cost of manufacture with regard to both materials and labor, and which accordingly is then susceptible of low prices of sale to the consuming public, thereby making such floating drain seal economically available to the buying public.

Still yet another object of the present invention is to provide a new and improved floating drain seal which provides in the apparatuses and methods of the prior art some of the advantages thereof, while simultaneously overcoming some of the disadvantages normally associated therewith.

Still another object of the present invention is to provide a new and improved floating drain seal wherein the same is reciprocable within a drainage housing to effect closure of the drain upon a back-filling of fluid accumulating within the drain housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic cross-sectional view of the drain seal in a lowered first position.

FIG. 2 is an orthographic cross-sectional view of the floating drain seal in a raised second position.

FIG. 3 is an isometric illustration of the float utilized by the instant invention.

FIG. 4 is an isometric illustration of the central gasket utilized by the instant invention.

DESCRIPTION OF THE PREFERRED EMBODIMENT

Figure 5:
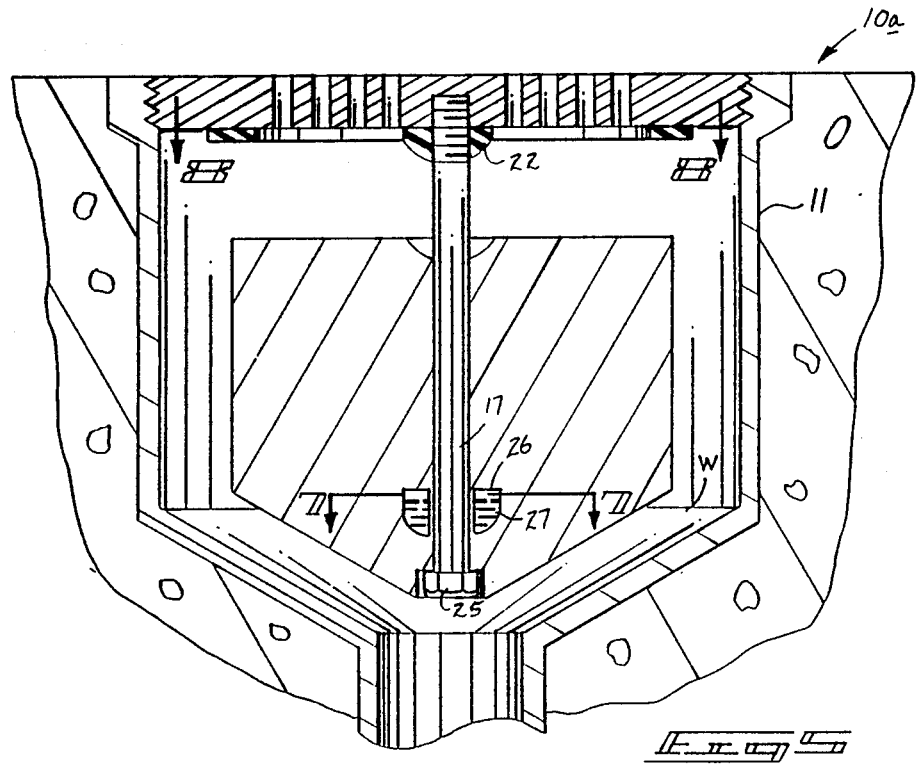
FIG. 5 is an orthographic cross-sectional view of a modified floating drain seal of the instant invention in a lowered position.

With reference now to the drawings, and in particular to FIGS. 1 to 8 thereof, a new and improved floating drain seal embodying the principles and concepts of &he present invention and generally designated by the reference numeral 10 will be described.

More specifically, the floating drain seal 10 essentially comprises a drain housing 11 formed with a cylindrical side wall, with an apertured inlet plate 12 formed with a matrix of apertures 12a defined within a predetermined circular diameter coaxially aligned with the plate 12. A coaxially aligned outlet pipe 13 is further axially aligned with a tapered conical bottom wall 14 of the housing 11. A float member 15 is defined by cylindrical side walls spaced interiorly of the side walls of the housing 11 and formed with a conical bottom surface 16 spaced on the conical bottom wall 14 to enable fluid flow through the housing 11 into the outlet pipe 13 to effect drainage of fluid therethrough. The float member 15 is formed with an axial bore 17 and an axial aligned cylindrical recess 18 formed at the apex of the conical bottom surface 16. The float member 15 is further formed with a planar top surface 19 formed with an axially aligned hemispherical recess 20 aligned with the axial bore i7 and the cylindrical recess 18. A resilient tubular gasket 21 is defined by cylindrical side walls and a hemispherical bottom surface, wherein the hemispherical bottom surface is in a complementary configuration receivable within the hemispherical recess 20, wherein the cylindrical side walls of the tubular gasket 21 are of a height substantially equal to that defined by resilient tubular gasket 21 of an internal diameter greater than that defined by the predetermined circular diameter of the matrix of apertures 12a. A float retaining rod 23 is slidably mounted within the axial bore 17 and is formed with a threaded upper end 24 directed coaxially through the cylindrical seal 22 and orthogonally into the inlet plate 12. An enlarged lower end head 25 is receivable within a cylindrical recess 18 and limits a bottommost positioning of the float 15 relative to the conical bottom wall 14 of the drain housing 11.

During conventional drainage of fluid through the apertures 12a, the fluid is directed around the float 15 and between the bottom surface 16 of the float and the bottom wall 14 of the housing. When fluid or water "W" within the housing 11 is of diminished flow or when the outlet pipe 13 is plugged, the water "W" will rise within the housing 11 and the float 15, formed of a conventional polymeric or non-corrosive metal such as brass, will be directed upwardly, as illustrated in FIG. 2 for example, and receive the cylindrical seal 22 within the hemispherical recess 20, and wherein the planar top surface 19 will come into engagement with &he tubular gasket 21 and prevent the water "W" within the housing 11 to flow exteriorly of the housing 11 preventing flooding within a dwelling or enclosure and further prevent the contaminated drainage water from entering such dwellings.

Figure 6:
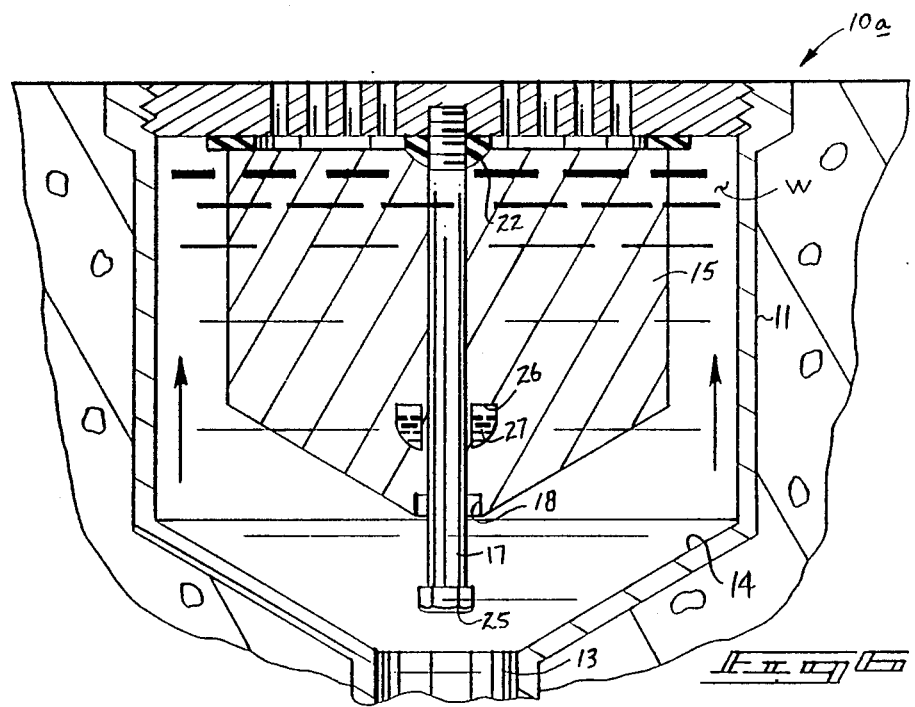
FIG. 6 is an orthographic cross-sectional view of the modified floating drain seal in a raised second position.
Figure 7:
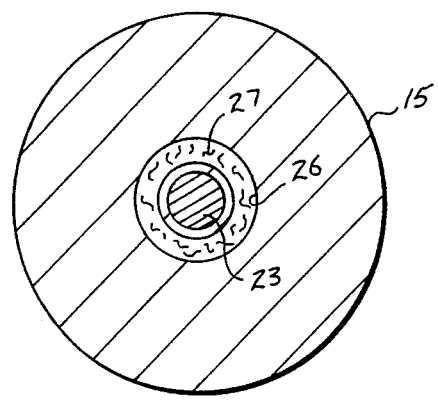
FIG. 7 is an orthographic view taken along the lines 7—7 of FIG. 5 in the direction indicated by the arrows.
Figure 8:
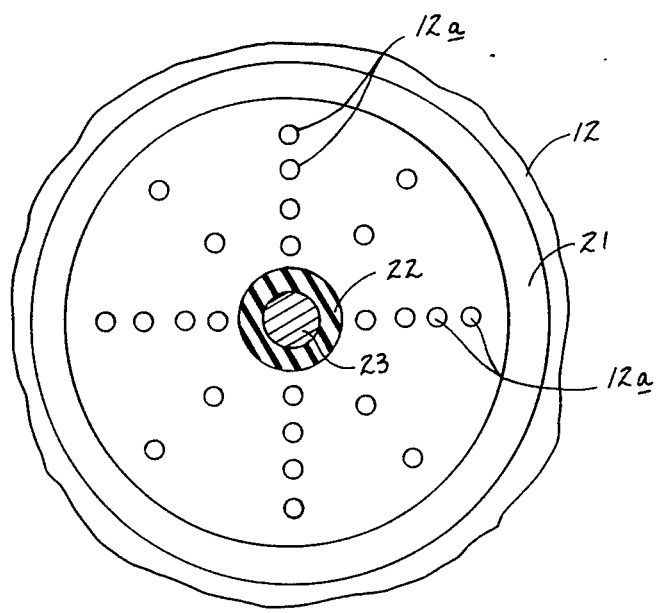
FIG. 8 is an orthographic plan view of the gasket arrangement of the instant invention taken along the lines 8—8 of FIG. 5 in the direction indicated by the arrows.

FIGS. 5 and 6 are illustrative of a modified floating drain seal 10 wherein a tubular cavity 26 is formed with a conical lower portion with a mercury leveling medium 27 positioned therewithin to define a volume less than that of the tubular cavity 26 to effect alignment of the float member 15 relative to the rod 23 in use.

As to the manner of usage and operation of the instant invention, the same should be apparent from the above disclosure, and accordingly no further discussion relative to the manner of usage and operation of the instant invention shall be provided.

With respect &o the above description then, it is to be realized that the optimum dimensional relationships for the parts of the invention, to include variations in size, materials, shape, form, function and manner of operation, assembly and use, are deemed readily apparent and obvious to one skilled in the art, and all equivalent& relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted &o, falling within the scope of the invention.

What is claimed as being new and desired to be protected by LETTERS PATENT of the United States is as follows:

1. A floating drain seal comprising in combination,
    a drain housing including side walls, a bottom wall, a drain conduit directed through the bottom wall, and a top plate member, the top plate member including a matrix of apertures directed therethrough confined within a predetermined radius as measured axially of the top plate member, and
    a seal member in a fixed surrounding relationship to the aperture and
    a float means reciprocatably mounted relative to the top plate member and positionable from a first lowered position spaced from the sealed member to a second raised position in operative sealing engagement with the seal member to effect a fluid seal between the apertures and the drain conduit, and wherein the housing side walls are cylindrical side walls and the bottom wall is defined by a conical surface with the drain conduit coaxially aligned relative to the side walls and the bottom wall, and float member is defined by cylindrical sides of a further radius greater than that defined by the predetermined radius and further includes a conical bottom surface, and a planar top surface, and wherein the seal member is defined by an interior radius greater than that defined by the predetermined radius but less than that defined by the further radius of the float member, and wherein the seal member is a tubular seal member of predetermined height, and wherein a retaining rod is orthogonally and fixedly coaxially mounted relative to an underlying surface of the top plate member and extends downwardly relative to the top plate member a length greater than that defined by the float means and slidingly and coaxially received therewithin, and further including a cylindrical seal surroundingly mounted about the rod and affixed to the underlying surface formed with cylindrical sides and hemispherical bottom surface, the cylindrical sides equal to the height of the seal member, and the top surface of the top planar surface of the float means including a coaxially aligned hemispherical recess of complementary configuration to the hemispherical recess defined by the cylindrical seal to receive the hemispherical surface of the cylindrical seal therewith in a fluid impermeable relationship to prevent passage of water through the drain housing.

2. A floating drain seal as set forth in claim, 8 wherein the seal member is fixedly mounted to an underlying surface of the top plate member, and the cylindrical seal is fixed to the underlying surface of the top plate member in sealing relationship to the retaining rod.

3. A floating drain seal as set forth in claim 6 further including a tubular cavity formed coaxially within the float means adjacent the bottom surface of the float means, wherein the tubular cavity defined by a conical lower portion, and the conical lower portion includes a mercury fluid medium therewithin for maintaining alignment of the float means relative to the top plate member.

* * * * *